United States Patent Office 3,342,725
Patented Sept. 19, 1967

3,342,725
HYDROCRACKING OF HYDROCARBONS WITH A PRESULFIDED AMMONIUM CRYSTALLINE ZEOLITE CRACKING BASE PROMOTED WITH A GROUP VIII METAL
Dean Arthur Young, Yorba Linda, Calif., assignor to Union Oil Company of California, Los Angeles, Calif., a corporation of California
No Drawing. Filed July 7, 1965, Ser. No. 470,201
12 Claims. (Cl. 208—111)

This application is a continuation-in-part of application Serial No. 276,721, filed April 30, 1963, now U.S. Patent No. 3,239,451.

This invention relates to the catalytic hydrocracking of hydrocarbons to produce therefrom lower boiling hydrocarbons, boiling for example in the gasoline range. The invention is particularly directed to the provision of certain novel hydrocracking catalysts which have been presulfided in such manner as to improve their hydrocracking activity, and particularly their specific activity for hydrocracking paraffinic hydrocarbons.

Briefly, the new hydrocracking catalysts of this invention comprise a crystalline, zeolitic, molecular sieve cracking base containing a small proportion of a Group VIII metal hydrogenating component, said catalyst having been presulfided with hydrogen sulfide while in an ammonium form. The presulfided ammonium zeolite is then later converted, as by calcining or high-temperature reduction, to a "decationized" or hydrogen form of the zeolite. The resulting presulfided and reduced hydrogen zeolite catalysts are then ready for use in hydrocracking. It has been found that the presulfiding technique brings about a marked improvement in hydrocracking activity, particularly paraffin hydrocracking activity, which is not obtainable if the catalyst is presulfided after conversion of the ammonium zeolite to the decationized or hydrogen form. It has further been found that the beneficial effect of presulfiding can be enhanced if carried out under substantially anhydrous conditions.

It has recently been discovered that certain zeolitic molecular sieve compositions, e.g., those of the Y crystal type, constitute excellent hydrocracking catalysts when compounded by ion exchange with Group VIII metal hydrogenation catalysts such as palladium. Ion exchange is normally effected by digesting the zeolite in its ammonium form with a suitable salt of the hydrogenating metal wherein the metal appears in the cation. The ion-exchanged composite is then dried and preferably reduced with hydrogen, thus activating the catalyst. In theory, the resulting catalysts should contain the hydrogenating metal in the ultimate of homogeneous dispersion, i.e., in substantially mono-atomic distribution. It came as a distinct surprise to find that these catalysts do not in fact display the maximum possible activity for hydrocracking, but that a substantial increase in activity is obtained by the presulfiding technique. The reason for this improvement is not clearly understood, but apparently the presulfiding either renders some of the latent cracking sites more accessible to paraffinic hydrocarbons, and/or there may be brought about a more optimum distribution of the Group VIII metal with respect to active cracking sites. Still another possibility is that the presulfiding merely stabilizes the active centers against unfavorable changes occurring during subsequent activation of the catalyst by hydrogen reduction.

The catalysts of this invention are particularly effective for the hydrocracking of mineral oil feedstocks which contain substantial proportions of paraffinic hydrocarbons. Where the feedstock is wholly aromatic in nature, they are not markedly superior, but a substantial overall increase in conversion efficiency is observed where the feedstock contains both aromatic and paraffinic hydrocarbons.

The molecular sieve cracking bases of this invention are partially dehydrated, zeolitic crystalline compositions composed usually of silica, alumina, and one or more exchangeable cations such as sodium, hydrogen, magnesium, calcium, etc. They are further characterized by crystal pores of relatively uniform diameter between about 6 and 14 A. Several crystal forms of such molecular sieves are now available and suitable for use herein, e.g., those of the X, Y or L crystal types, or synthetic mordenite. It is preferred to employ molecular sieves having a relatively high $SiO_2/Al_2O_3$ mole-ratio, between about 2.5 and 10, preferably between about 3 and 8. In particular, the Y molecular sieves having crystal pore diameters of about 9 to 10 A, and wherein the $SiO_2/Al_2O_3$ ratio is about 4–6, are preferred, either in their hydrogen form, or a polyvalent metal form, preferably magnesium. The most active hydrocracking bases are those wherein the exchangeable zeolitic cations are hydrogen and/or a polyvalent metal such as magnesium, calcium, zinc, or rare earth metals.

Normally, these molecular sieves are prepared first in the sodium form, but it is preferred that most or all of the sodium be ion exchanged out with a polyvalent metal, or where a hydrogen form is desired, with an ammonium salt followed by heating to decompose the zeolitic ammonium ion and leave a hydrogen ion. In some cases, as in the case of synthetic mordenite, the hydrogen forms can be prepared by direct acid treatment of the alkali metal sieves. These hydrogen sieves are sometimes referred to as being "decationized." Y sieve zeolites of this nature are more particularly described in U.S. Patent No. 3,130,006.

The essential active metals employed herein as hydrogenation components are those of Group VIII, i.e., iron, cobalt, nickel, ruthenium, rhodium, palladium, osmium, iridium, and platinum, or mixtures thereof. The noble metals are preferred, and particularly palladium and platinum. In addition to these metals, other promoters may also be employed in conjunction therewith, including the metals of Groups VIB and VIIB, e.g., molybdenum, chromium, manganese, etc.

The amount of hydrogenating metal in the catalyst can vary within wide ranges. Broadly speaking, any amount between about 0.1% and 20% by weight may be used. In the case of the noble metals, it is normally preferred to use about 0.2% to 2% by weight. The metal may be added by impregnation and/or ion exchange using appropriate salt solutions wherein the metal is present in a non-sulfided form. Adding the metal as preformed sulfide, as e.g. a sulfide hydrosol, does not give the desired results. The preferred method of adding the hydrogenating metal is by ion exchange. This is accomplished by digesting the zeolite, preferably in its ammonium form, with an aqueous solution of a suitable compound of the desired metal wherein the metal is present in a cationic form, and then reducing to form the free metal, as described for example in Belgian Patent No. 598,686.

If desired, the sulfiding operation may be carried out by simply bubbling hydrogen sulfide through the aqueous slurry resulting from the ion exchange of Group VIII metal onto the catalyst. But for best results, it is preferred to condition the ion-exchanged catalyst for the sulfiding pretreatment by subjecting it to a substantial dehydration to reduce the water content to a level which is at least below the adsorption capacity of the catalyst, and preferably below about 10% by weight. The zeolite catalysts of this invention are strong adsorbents for water, and are generally capable of holding about 25–30% by weight of adsorbed water at atmospheric temperatures and pressures.

To reduce the water content of the catalysts to below about 30% by weight, the freshly exchanged catalyst, in its ammonium form, may be dried at relatively low temperatures, e.g., below about 300° F., in a dry stream of gas until the water content is reduced to, e.g., about 5–25% by weight. By this procedure the zeolitic ammonium content is not decomposed, and a sensibly dry form of the ammonium zeolite is obtained. In those cases where a finished catalyst has already been obtained (i.e., one which has been previously heated to form the hydrogen zeolite), it may be reammoniated with dry ammonia gas at, e.g., 50–300° F. prior to sulfiding, and after sulfiding, reactivated by hydrogen reduction at, e.g., 600–900° F.

The sulfiding treatment of this invention is preferably, though not necessarily, carried out as a pretreatment procedure after the catalyst is placed in the hydrocracking reactor. Sulfiding is carried out by passing through the ammonium zeolite catalyst bed, gaseous mixtures comprising hydrogen sulfide, or other readily decomposable organic sulfur compound, preferably in admixture with hydrogen, nitrogen or other inert gas. The treatment is continued for a sufficient time to bring about complete sulfiding of the hydrogenating metal on the catalyst, normally about 30 minutes to 8 hours. Temperature is a critical factor during sulfiding. In general, temperatures below about 500° F., and preferably below 300° F., should be maintained, at least for the initial portion of the sulfiding operation. It has been found that where the sulfiding is carried out exclusively at high temperatures, e.g., above about 500° F., the finished catalyst has a substantially lower paraffin hydrocracking activity, because at these high temperatures the ammonium zeolite is decomposed and converted to a hydrogen form before the sulfiding is completed. It has also been observed that high pressures are detrimental during sulfiding, and it is hence preferred to utilize pressures of about 0 to 100 p.s.i.g. The combination of high temperatures and high pressures during sulfiding is most highly detrimental and should be avoided.

For best results, at least about 60% of the zeolitic ion exchange capacity should be satisfied by ammonium ions during the sulfiding treatment. However, substantial improvement in activity is obtained when as little as 10% of the exchange capacity is satisfied by ammonium ions, as compared to the results obtained when the zeolite is completely in a hydrogen form during sulfiding.

A typical presulfiding operation is carried out by passing a 1/1 mixture of hydrogen and hydrogen sulfide over the ammonium zeolite catalyst at room temperature and atmospheric pressure at the rate of about 40 s.c.f. per hour per volume of catalyst for about 2 to 6 hours.

Following the presulfiding treatment, the catalyst is heated at temperatures of e.g., 600°–1,000° F. in order to decompose the zeolitic ammonium ions and form the active hydrogen and/or decationized zeolite. The heating may be carried out for, e.g., 0.5–12 hours in a stream of inert gas such as nitrogen, but prefarably hydrogen is employed whereby the catalyst is simultaneously reduced and activated with removal of both ammonia and sulfur from the catalyst. In some cases, it may be found difficult to remove all ammonia and sulfur, and in such instances it may be desirable to subject the catalyst to an oxidation treatment at, e.g., 600–1,000° F., and then again reduce with hydrogen. The heating and/or reducing treatments may be carried out as pressures of e.g., 0–1,000 p.s.i.g., but atmospheric pressures are preferred.

The pretreated catalysts of this invention may be employed for the hydrocracking of substantially any mineral oil fraction boiling above the gasoline range, i.e., above about 300° F., and usually above about 400° F., and having an end-boiling-point up to about 1,000° F., but preferably not greater than about 850° F. These feedstocks may contain up to about 5% by weight of sulfur, and they may also contain organic nitrogen compounds. The presulfiding technique is of greatest benefit however, for hydrocracking in a sulfur-free system; this entails the use of feedstocks substantially free of sulfur, i.e., containing less than 0.1% by weight of sulfur. Specific feedstocks contemplated comprise straight-run gas oils and heavy naphthas, coker distillate gas oils and heavy naphthas, deasphalted crude oils, cycle oils derived from catalytic or thermal cracking operations and the like. Specifically, it is preferred to employ oils having an API gravity between about 25 and 35°, and containing at least about 20% by volume of paraffinic hydrocarbons.

Hydrocracking conditions to be employed herein fall within the following ranges:

|  | Operative | Preferred |
| --- | --- | --- |
| Temperature, °F | 400–850 | 500–750 |
| Pressure, p.s.i.g. | 400–5,000 | 750–2,000 |
| H$_2$/oil ratio, s.c.f./b | 1,000–15,000 | 2,000–10,000 |
| LHSV, v./v./hr. | 0.1–10 | 0.5–5 |

Depending upon the severity of the hydrocracking conditions, and the refractoriness of the feed, it will be observed that the activity of the catalyst will have declined considerably after a period of time ranging between a few hours to several months. When the activity has declined to an undesirable level, the flow of feedstock is terminated, and the catalyst is regenerated by combustion at, e.g. 400–1,000° F., according to conventional regeneration procedures.

The following examples are cited to demonstrate the critical effects of the novel features of this invention, but are not to be construed as limiting in scope:

*Example I*

A molecular sieve cracking base of the Y crystal type, having a SiO$_2$/Al$_2$O$_3$ mole-ratio of about 4.7, in its hydrated ammonium form, was used to prepare six different Pd-containing catalysts, as follows:

*Catalyst A* (unsulfided) was prepared in the conventional manner by exchanging the ammonium zeolite with tetramine-palladium chloride to add 0.5% by weight of palladium. The Pd-containing ammonium zeolite was then drained, dried, pelleted and calcined to expel the ammonia and form the catalytically active hydrogen zeolite.

*Catalyst B* was prepared by reammoniating a portion of catalyst A at room temperature with a 1/1 nitrogen-ammonia mixture, reducing in hydrogen for 2 hours at 850° F. in order to reduce the water content to below about 5% by weight and re-form the hydrogen zeolite, which was then sulfided in the dry state for 1 hour at 500° F. using a 1/1 hydrogen-hydrogen sulfide mixture. The sulfided catalyst was then reduced for 8 hours at 850° F., and oxidized at 850° F. in oxygen.

*Catalyst C* was prepared in the same manner as catalyst B, except that the sulfiding was carried out at room temperature instead of 500° F.

*Catalyst D* was prepared by reammoniating a portion of catalyst A with a 1/1 nitrogen-ammonia mixture, and then slurrying the powdered catalyst in water saturated with hydrogen sulfide for 2 hours, after which the slurry was heated to boiling, filtered, dried, and the powdered filter cake pelleted. The final pellets were reduced and oxidized as before.

*Catalyst E* was prepared by reammoniating a portion of catalyst A as before, purging with nitrogen at about 110° C. to remove excess ammonia and reduce the water content, then hydrating the ammonium zeolite catalyst with water-saturated air to bring the water content up to about 27% by weight, after which the hydrated catalyst was sulfided with a 1/1 hydrogen-hydrogen sulfide mixture at room temperature, followed by pelleting, reducing and oxidizing as before.

*Catalyst F* was prepared in the same manner as catalyst E, except that the hydration step was omitted, the sulfiding being performed on the relatively dry ammonium zeolite catalyst containing about 7–8% by weight of water.

Each of the foregoing catalysts was then tested for paraffin hydrocracking activity, using n-dodecane (56.4° API) as feed. The hydrocracking conditions were: Pressure, 1,000 p.s.i.g.; LHSV, 8.0; hydrogen/oil ratio, 20,000 s.c.f./b.; Temperature, 550–551° F. The results of the various runs after 3–4 hours onstream were as follows:

The higher activity of the sulfide catalyst is readily apparent, particularly its selective activity for converting the heavy ends of the feed. Here again the sulfided catalyst gave higher iso/normal paraffin ratios.

TABLE 1

| | Run No. | | | | | |
|---|---|---|---|---|---|---|
| | 1 | 2 | 3 | 4 | 5 | 6 |
| Catalyst | A | B | C | D | E | F |
| Sulfiding Method | None | Pd-H-Zeolite sulfided dry at 500° F. | Pd-H-Zeolite sulfided dry at room temp. | Pd-NH$_4$-Zeolite sulfided in aqueous slurry at room temp. | Pd-NH$_4$-Zeolite hydrated (27% H$_2$O) and sulfided at room temp. | Pd-NH$_4$-Zeolite sulfided dry (7-8% H$_2$O) at room temp. |
| Product Gravity, ° API | 57.8 | 58.0 | 66.5 | 67.7 | 65.8 | 82.3 |
| Vol.-Percent C$_3$-C$_9$ Hydrocarbons in Product | 9.5 | 6.3 | 44.2 | 48.1 | 38.6 | 91.1 |
| Iso/Normal Paraffin Ratios in Product: | | | | | | |
| C$_4$ | 1.6 | 1.2 | 1.7 | 1.8 | 1.8 | 1.9 |
| C$_5$ | 2.2 | 2.2 | 3.3 | 3.3 | 3.6 | 4.1 |
| C$_6$ | 2.7 | 2.4 | 3.6 | 3.4 | 3.6 | 3.7 |

The foregoing data clearly demonstrate the synergistic effect of ammoniating the catalyst prior to sulfiding, and a comparison of Runs 4, 5 and 6 shows that this synergistic effect is further enhanced by reducing the water content of the zeolite. Finally, the data show that a substantial improvement in iso/normal paraffin ratios is obtained by the sulfiding treatment.

Example II

To test the effects of catalyst presulfiding on the hydrocracking of a mixed paraffinic-aromatic feedstock, two additional catalysts were prepared as follows:

Catalyst G was prepared by reammoniating a portion of catalyst A, adding another 0.5% by weight of palladium (1% palladium total) by ion-exchange with a solution of tetrammine palladium nitrate. The exchanged catalyst was dried, pelleted and converted to the hydrogen form by reducing at 875° F. for 48 hours, and then oxidizing 4 hours at 800° F.

Catalyst H was prepared in the same manner as catalyst G, except that, following the addition of the second 0.5% of palladium, the wet exchange slurry was saturated with hydrogen sulfide, followed by evaporation of the slurry to dryness, pelleting and activating as previously described.

Each of the foregoing catalysts was then compared for hydrocracking activity using as feedstock a hydrofined gas oil boiling between about 390° and 820° F., having an API gravity of 34°, and containing about 25% by volume aromatics and 74% saturated hydrocarbons. Hydrocracking was carried out at 700–701° F., 1,000 p.s.i.g., 8 LHSV and using 20,000 s.c.f./b. of hydrogen. The results were as follows:

TABLE 2

| | Run No. | |
|---|---|---|
| | 7 | 8 |
| Catalyst | G | H |
| Sulfiding Method | None | (1) |
| Product Gravity, ° API | 42.4 | 45.7 |
| Conversion (Vol.-Percent) to: | | |
| 0–360° F. | 24.7 | 34.3 |
| 360–500° F. | 25.2 | 25.7 |
| 500+° F. Botts | 48.2 | 38.9 |
| Iso/Normal Paraffin Ratios in Product: | | |
| C$_4$ | 1.2 | 1.3 |
| C$_5$ | 6.6 | 9.7 |
| C$_6$ | 7.2 | 11.8 |

$^1$ Pd-NH$_4$-Zeolite sulfided in aqueous slurry at room temp.

Example III

This example demonstrates that the improved paraffin hydrocracking activity shown in the foregoing examples is not obtained when, instead of adding the palladium to the zeolite in an unsulfided form and then sulfiding, it is initially added as a preformed sulfide hydrosol. A portion of catalyst substantially identical to catalyst A above (0.5% palladium) was reammoniated and impregnated with an additional 0.5% by weight of palladium by immersing in a palladium sulfide hydrosol prepared by bubbling H$_2$S through a 0.89% aqueous solution of ammonium tetrachloro palladate. The impregnated catalyst was drained, dried, pelleted, reduced in a stream of hydrogen for 16 hours at 850° F. and then calcined in air at 850° F. for 16 hours (catalyst J). This catalyst was then compared in hydrocracking activity with a nonsulfided catalyst (K) prepared by adding the second 0.5% palladium by ion exchange, using both n-dodecane and tetralin as feedstocks. The results were as follows:

TABLE 3

| | Run No. | | | |
|---|---|---|---|---|
| | 9 | 10 | 11 | 12 |
| Catalyst | J | K | J | K |
| Sulfiding Method | PdS sol. | None | PdS sol. | None |
| Feed | n-C$_{12}$ | n-C$_{12}$ | Tetralin | Tetralin |
| Product Gravity, ° API | 58.3 | 61.3 | 46.7 | 21.7 |
| Vol.-percent: | | | | |
| C$_3$-C$_6$ product | | | 12.8 | 1.6 |
| C$_3$-C$_9$ product | 9.0 | 25.8 | | |

It is readily apparent that adding the palladium as a sulfide hydrosol does not improve the paraffin hydrocracking activity, but does effect a substantial improvement in aromatic hydrocracking activity.

Substantially similar differential results are obtained when other hydrocracking catalysts and feedstocks within the purview of this invention are substituted in the foregoing examples. It is therefore not intended that the invention should be limited to the details of the examples but broadly as defined in the following claims:

I claim:
1. A method for increasing the activity of a hydrocracking catalyst, said catalyst comprising a crystalline, zeolitic, alumino-silicate molecular sieve cracking base upon which is deposited a minor proportion of a Group VIII metal hydrogenating promoter, which comprises sub- jecting an ammonium form of said catalyst containing less than about 25% by weight of water to a presulfiding treatment by contacting the same with hydrogen sulfide under substantially anhydrous conditions at a temperature below about 500° F., and then heating the sulfided ammonium zeolite catalyst at elevated temperatures to decompose zeolite ammonium ions.

2. A method as defined in claim 1 wherein at least about 60% of the ion-exchange capacity of said zeolitic cracking base is satisfied by combined ammonium ions during said presulfiding treatment.

3. A method as defined in claim 2 wherein the catalyst containing less than about 10% by weight of water when subjected to said presulfiding treatment.

4. A method as defined in claim 1 wherein said presulfiding treatment is carried out at a temperature below about 300° F., and a pressure below about 100 p.s.i.g., and wherein the catalyst contains less than about 10% by weight of water when subjected thereto.

5. A process as defined in claim 1 wherein said catalyst, when subjected to said presulfiding treatment is a zeolitic, alumino-silicate molecular sieve of the Y crystal type combined by ion exchange with a Group VIII noble metal hydrogenating promoter.

6. A catalyst composition comprising a zeolitic, alumino-silicate molecular sieve cracking base of the Y crystal type upon which is deposited a small proportion of a Group VIII metal hydrogenating promoter, the zeolitic cation content of said cracking base comprising a substantial proportion of hydrogen ions, said catalyst having been prepared and presulfided as defined in claim 1.

7. A process for hydrocracking a hydrocarbon feedstock which comprises subjecting said feedstock plus added hydrogen to hydrocracking conditions of temperature and pressure in contact with a catalyst comprising a zeolitic, alumino-silicate molecular sieve cracking base of the Y crystal type upon which is deposited a small proportion of a Group VIII metal hydrogenating promoter, the zeolitic cation content of said cracking base comprising a substantial proportion of hydrogen ions, said catalyst having been prepared and presulfided as defined in claim 1.

8. A process for hydrocracking a hydrocarbon feedstock which comprises subjecting said feedstock plus added hydrogen to hydrocracking conditions of temperature and pressure in contact with a catalyst comprising a zeolitic, alumino-silicate molecular sieve cracking base of the Y crystal type upon which is deposited a small proportion of a Group VIII metal hydrogenating promoter, the zeolitic cation content of said cracking base comprising a substantial proportion of hydrogen ions, said catalyst having been prepared by ion-exchanging said Group VIII metal into an ammonium form of said zeolitic cracking base and drying the same to a water content below about 25% by weight, followed by (a) sulfiding of the dried, ion-exhanged, sulfided, ammonium zeolite composite with hydrogen sulfide under substantially anhydrous conditions at a temperature below about 500° F., and then (b) reducing in hydrogen at an elevated temperature to convert zeolitic ammonium ions to hydrogen ions.

9. A process as defined in claim 8 wherein said sulfiding step (a) is carried out at a temperature below about 300° F., and a pressure below about 100 p.s.i.g., and wherein the catalyst contains less than about 10% by weight of water when subjected thereto.

10. A process as defined in claim 8 wherein said Group VIII metal is a noble metal.

11. A process as defined in claim 8 wherein said Group VIII metal is palladium.

12. A process as defined in claim 8 wherein said hydrocarbon feedstock comprises a substantial proportion of paraffinic hydrocarbons, and is substantially sulfur-free.

References Cited

UNITED STATES PATENTS 3,239,451    3/1966    Young _____ 208—111

DELBERT E. GANTZ, *Primary Examiner.*

ABRAHAM RIMENS, *Examiner.*